United States Patent Office 2,878,013
Patented Mar. 17, 1959

2,878,013

JERK ABSORBER FOR TOW ROPES AND SIMILAR FLEXIBLE MEMBERS

Roberto Piodi, Turin, Italy

Application February 1, 1957, Serial No. 637,784

Claims priority, application Italy November 22, 1956

4 Claims. (Cl. 267—69)

This invention relates to a jerk-absorber for ropes and similar flexible members, such as ropes for towing motor vehicles.

Absorbing devices intended for the same purpose are known, said devices comprising generally an elongated member of resilient material or a helical spring provided at its ends with anchoring means for the rope and towing or towed vehicle. These known devices suffer from the drawback of undergoing an elongation directly proportional to the pull to which they are submitted and are therefore not in a condition to satisfactorily react to high-intensity jerks. Moreover, when the devices are made of rubber, they are generally a weak point in the line along which the pull is exerted.

It is an object of this invention to eliminate the drawbacks of known devices, more particularly to provide a jerk-absorbing device for the uses mentioned above and, generally, whenever a rope is pulled with a sharp start, which undergoes a gradually smaller deformation with equal successive increments in pull.

A further object of this invention is to provide an absorbing device of the type referred to, which merely absorbs jerks, without traction being necessarily transmitted therethrough.

The improved jerk-absorber for ropes or other flexible members subjected to pull comprises an elongated member, such as a plate of resilient material having transverse holes bored therein through which the flexible member, such as a rope is passed alternately from opposite sides of the elongated member, whereby said flexible member takes an undulated configuration. Under the action of a jerk the resilient member is deformed to absorb its effects.

The resilient member of plate shape is preferably provided with protruding portions alternating on both sides between the holes to serve as abutments for the rope lengths extending over the plate between the successive holes therein.

The invention will be described with reference to the accompanying drawings, wherein.

The jerk-absorber comprises an elongated resilient member 2 having transverse holes 2a bored therein, through which the rope 1 or other flexible member extends alternately from opposite sides of the resilient member, whereby the rope 1 takes an undulated configuration. Consequently, when the rope 1 undergoes a jerk, the resilient member is deformed to damp the effects of jerk.

Figure 1:
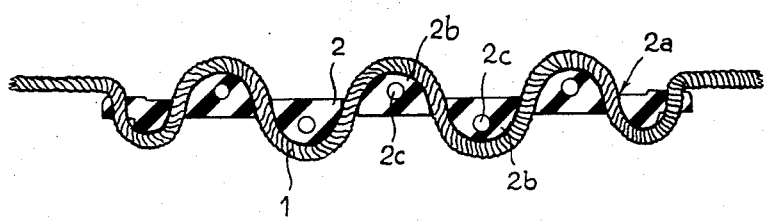
Figure 1 is a longitudinal cross-sectional view of a first embodiment.
Figure 2:
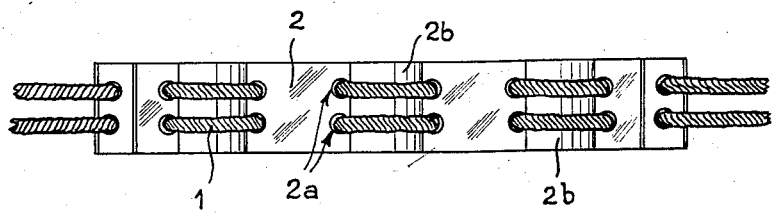
Figure 2 is a plan view.
Figure 3:
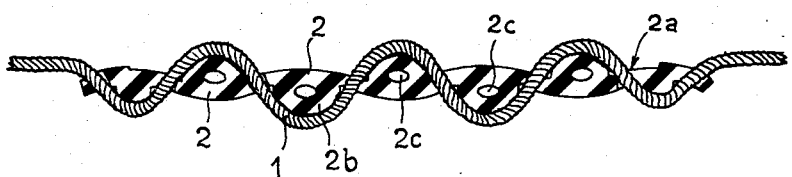
Figure 3 shows the device in a stretched condition.

The elongated member 2 preferably made of rubber is provided between adjacent transverse holes 2a (Figures 1 to 3) with protruding portions 2b situated alternately on opposite sides. The flexible member 1 is fitted through the holes 2a and encircles the protruding portions 2b. By varying, for instance, the size of projections and thickness of the resilient member, the resiliency of the latter can be suited to the various purposes contemplated.

If desired, the projections 2b can have laterally extending holes 2c bored therein for effecting the resilient deformation of the device undergoing a pull and jerk.

Figure 4:
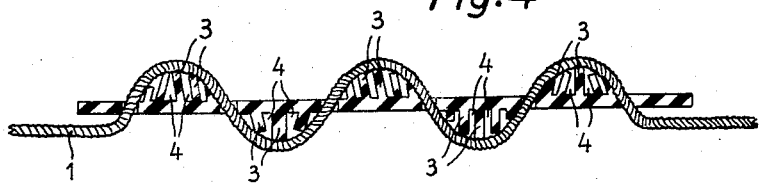
Figure 4 is a longitudinal cross-sectional view of a modified construction.

In the modified construction shown in Figure 4 the projections are in the form of a plurality of laminae 3 which may be directed perpendicular to the plate or inclined thereto through equal or different angles, as shown on the drawing, clearances 4 being left between the laminae to allow of deformation of the latter.

The jerk-damping device is of gradually increasing stiffness with increase in traction. In other words, the increments in deformation undergone thereby gradually decrease with constant increments in traction.

Moreover, the device is no weak point in the traction transmitting line, inasmuch as the greatest traction stress is constantly taken up by the flexible member or rope 1.

It will be understood that, the principle of the invention being left unaltered, constructional details and embodiments can be modified from the examples described and illustrated without departing from the scope of this invention.

What I claim is:

1. A jerk absorbing device for ropes or other flexible members subjected to traction, more particularly for ropes for trailing vehicles, comprising an elongated plate of a substantial thickness made of resilient material, such as rubber, a row of transverse holes bored therein through which the rope passes and extends alternately along sections of the plate surface at opposite faces of the plate between successive holes, whereby said rope takes an undulated configuration and when subjected to a jerk effects a deformation of said plate, thereby damping the effects of said jerk.

2. A jerk absorbing device for ropes or other flexible members subjected to traction, more particularly for ropes for trailing vehicles, comprising an elongated plate of a substantial thickness made of resilient material, such as rubber, a row of substantially equidistant holes bored therein through which the rope passes and extends alternately along sections of the plate surface at opposite faces of the plate between successive holes, whereby said rope takes an undulated configuration and, when subjected to a jerk effects a deformation of said plate, thereby damping the effects of said jerk.

3. A jerk absorbing device for ropes or other flexible members which may be subjected to traction, more particularly for ropes for trailing vehicles, comprising an elongated plate of a substantial thickness made of resilient material, such as rubber, provided with a row of transverse holes bored therein and projections alternately protruding from opposite plate faces and situated between said transverse holes, the rope being alternately passed through said holes from one side to the other of said plate, so as to become superposed on said projections, whereby the rope takes an undulated configuration and when subjected to the jerk effects a deformation of said projections and plates, damping the effects of said jerk.

4. A jerk absorbing device for ropes or other flexible members which may be subjected to traction, more particularly for ropes for trailing vehicles, comprising an elongated plate of a substantial thickness made of resilient material, such as rubber, provided with a row of transverse holes bored therein and projections alternately protruding from opposite plate faces and situated between said transverse holes, said projections being formed with laterally extending holes, adapted to promote resilient deformations, the rope being alternately passed through said transverse holes from one side to the other of said plate, so as to become superposed on said projections, whereby the rope takes an undulated configuration and when subjected to the jerk effects a deformation of said projections and plates, damping the effects of said jerk.

References Cited in the file of this patent

FOREIGN PATENTS 880,241  France ---------------- Mar. 16, 1942